Patented Jan. 11, 1949

2,458,818

UNITED STATES PATENT OFFICE 2,458,818

SOLID CATALYST TREATMENT OF GASEOUS HYDROCARBONS

David W. Young, Roselle, N. J., assignor to Standard Oil Development Company, a corporation of Delaware No Drawing. Application November 9, 1945, Serial No. 627,789

6 Claims. (Cl. 260—683.15)

This invention relates to a catalytic treatment for transforming low molecular weight hydrocarbons into more useful products and more particularly to a process for polymerizing normally gaseous olefins into valuable motor fuel ingredients by treatment with a sturdy solid catalyst containing titanium in highly activated form.

It is known that prior to this invention certain catalysts were developed for promoting polymerization of gaseous olefins at moderately elevated temperatures to overcome deficiencies of high temperature polymerization processes. Catalysts considered as outstanding for this purpose are typified by solid phosphoric acid and similar substances which are acidic and hygroscopic in nature.

Suitability of the catalyst depends upon a number of factors. It is desirable that the catalyst be non-corrosive to apparatus, sufficiently inexpensive to prepare, rugged and long-lived. It is also desirable that the catalyst effectively promote the desired reactions under economical conditions.

The primary object of this invention is to provide a method in which a suitable solid catalyst is employed for promoting desired reactions in transforming cracked hydrocarbon gases into valuable motor fuel components.

A more specific object is to provide a process for polymerizing gaseous olefins with a titanium oxide-containing catalyst which is highly active yet highly stable.

Attainment of the foregoing and further objects will appear from the following more detailed description and claims.

I have now found that a titanium catalyst which I developed has suitable properties for commercial utilization in attaining the objects set forth. This catalyst may be briefly characterized as being a solid inorganic gel impregnated with titanium oxide. The catalyst is synthesized in such a manner that the titanium oxide is preferably precipitated or deposited within the gel structure.

To briefly outline the preferred general method of transforming the catalyst, an inorganic gel, such as silica gel, is treated in the hydrogel stage with an alkaline solution of titanium oxide or a titanium salt, the titanium compound is precipitated within the hydrogel, after which the hydrogel is broken up, washed, dried, and activated by calcining.

In order to afford a better understanding of my invention, the following more specific example is set forth with the understanding that the precise details enumerated therein are purely illustrative and do not impose any limitation on the said invention.

Example 1

I first prepare a titanium sulfate solution of water (the compound having the general formula $TiOSO_4$), containing 201 grams of $TiO_2$ per liter, and this is slowly added to a saturated water solution of potassium bicarbonate. One part by volume of the clear titanium sulfate solution is added to 2.33 parts of potassium bicarbonate solution. The resulting clear mixture has a concentration of 60 grams of $TiO_2$ per liter and has a pH of 7.6 to 8.3 at room temperature. Improved stability of the alkaline titanium solution is obtained if crystals of $KHCO_3$ are present in the saturated solution at the start of the run.

Simultaneously, I prepare a silica gel in known manner, or by adding an acid such as a sulfuric acid to a sodium silicate solution. I prefer to use sodium silicate solutions containing 20% of $Na_2(SiO_3)_x$. The acid employed in making the gel may contain from 5–7% sulfuric acid and it is slowly added to the sodium silicate solution while stirring in order to form a sol. The sol is permitted to stand for several hours, say from 10–12 hours, whereupon it undergoes syneresis to form a jelly-like mass referred to as a hydrogel, or solid colloidal solution in water. The hydrogel is then broken up and washed in water in order to remove sodium sulfate and other water soluble salts. The gel is then dried by carefully heating the same up to a temperature of about 240° F.

The next step in the preparation of the catalyst is to treat the washed hydrogel with the aforementioned complex type alkaline solution of titanium oxide and the mixture of titanium oxide solution and hydrogel is heated for a period of about ½ hour at a temperature of about 176° F. The titanium solution undergoes hydrolysis and about 98% of the titanium is precipitated from the solution and deposited in very fine particles upon and in the silica gel. The mixture is then cooled and filtered. The residue comprising the silica gel with the titanium oxide contained therein is washed with water at room temperature, dried by heating to temperatures up to about 240° F. and finally slowly heated to temperatures about 1470–1670° F. for about two or three hours, whereupon the finished catalyst is produced after the calcining operation.

Referring again to the alkaline titanium oxide solution, it is pointed out that this may be prepared from iron free titanium hydroxide and sulfuric acid to form a clear solution, 1 mole of sulfuric acid of 100% strength being employed for each mole of titanium hydroxide. The titanyl sulfate solution (about 4 liters), which has a concentration of from 25-100 grams per liter is then slowly added at room temperature to 20 liters of a saturated water solution of potassium bicarbonate. The concentration of potassium bicarbonate employed is about 200-300 grams per liter. During the mixing of the material, the solution is agitated.

Instead of using $KHCO_3$ in the preceding example. I may employ $NH_4HCO_3$, or $NaHCO_3$. Also, I may use titanium nitrate or $TiCl_3$ in place of titanium sulfate, as the starting material.

Also, instead of causing precipitation of the titanium oxide on the gel carrier or support by hydrolysis effected by heating the alkaline solution of titanium oxide, I may subject the titanium oxide solution to electrolysis whereupon the titanium oxide is precipitated in situ on the gel. I prefer to employ a current of 1-2 amperes at about 6 volts.

Also, instead of employing silica gel as a carrier, I may also employ other known carriers such as mixed or plural gels of silica and alumina, or magnesia, or I may employ as a carrier magnesia gel or alumina gel. It is within the purview of my invention to treat dry gels, such as the metal oxide gels, with the above titanium compounds.

The titanium impregnated gel catalyst may be used for treating individual hydrocarbons or mixtures of hydrocarbons which are present in highly volatile or normally gaseous refinery cuts, such as the refinery $C_3$ to $C_5$ cuts which are recovered in stabilizing cracked gasoline distillates. At moderately elevated temperatures in the range of about 100° C. to 300° C., the catalyst promotes a polymerization reaction of gaseous olefins to convert the gaseous olefins predominately into liquids boiling mostly in the gasoline boiling range (between about 100° F. and 450° F.) The treatment may be carried out under atmospheric or subatmospheric pressures, preferably the latter, to increase productivity for a given apparatus. The rate of reaction is satisfactorily high so that only a short contact time is necessary between the reactant hydrocarbons and the catalyst.

Tests indicated that the titanium-gel catalyst is extremely rugged. The catalyst can be regenerated at temperatures ranging up to as high as 1700° F., and the regenerated catalyst was found as active as the freshly prepared catalyst.

Examples on the use of the catalyst for the treatment of gaseous olefins are as follows:

Example 2

A catalyst prepared as described in Example 1 was calcined at 1600° F. for two hours for use in a reactor. The catalyst was about 80% above 10 mesh size and 15% above 5 mesh size. The calcined catalyst was placed in a steel alloy tube reactor mounted in a heating furnace. A liquefied gaseous hydrocarbon feed stock was drawn from a pressure vessel through a valve which was used to control the flow rate of catalyst in the reactor tube. Receiver and flow measuring instruments were used to complete the equipment.

Representative data on the charging stock analysis, conditions of the treatment, and the results are set forth in the following tables:

Table I

| Analysis of charging stock | Percent |
|---|---|
| Refinery $C_4$ cut— | |
|    Isobutene _____percent | 15 |
|    Normal butenes _____do__ | 25 |
|    Normal butanes _____do__ | 60 |
| Polymerization zone conditions: | |
|    Pressure, kg./sq. cm_____ | 45 |
|    Temperature, °C_____ | 165 |
|    Catalyst volume, cc_____ | 60 |
|    Feed rate, vol. liquid charge/hr./vol. catalyst | 8.0 |
|    Polymer yield, wt. yield percent on feed unsaturates | 40.3 |
| Polymer product analysis: | |
|    Specific gravity, $d_4^{20}$_____ | 0.7363 |
|    A. S. T. M. distillation, °C.: | |
|      Initial | 42 |
|      10% | 112 |
|      30% | 116 |
|      50% | 136 |
|      70% | 181 |
|      90% | 270 |
|      End point | 303 |

The catalyst used for 7.2 hours in obtaining the data given in Table I was heated in air at 1600° F. for 2 hours. All organic material was removed from the catalyst in this treatment, and the regenerated catalyst was then employed to treat the same kind of charging stock to obtain the data set forth in the following table:

Table II

| Polymerization zone conditions: | |
|---|---|
|    Weight of regenerated catalyst, grams__ | 38.9 |
|    Feed rate, vol. liquid charge/hr./vol. catalyst | 10.6 |
|    Polymer yield, weight percent yield on unsaturates | 37.6 |
| Polymer product analysis: | |
|    Specific gravity, $d_4^{20}$_____ | 0.7365 |
|    A. S. T. M. distillation, °C.: | |
|      Initial | |
|      13% _____below__ | 12 |
|      30% _____over__ | 122 |
|      60% _____over__ | 199 |
|      70% _____over__ | 221 |
|      90% _____over__ | 243 |
|      End point | 296 |

Further tests proved that the titanium-gel catalyst is capable of polymerizing chemically pure propene to form propene dimers and trimers in a ratio of about 1 to 5 by contacting the propene feed with the catalyst at 250° C. and a pressure of 50 kg./sq. cm.

Using pentenes as a feed, polymerization was effected with the catalyst at 140° C. to obtain a polymer yield of 60% by weight. After slight stripping of light ends this product on analysis had an initial boiling point a little above 300° F. (149° C.).

Olefin polymer products obtained in accordance with the method described using the titanium-gel catalyst were hydrogenated and the hydrogenated polymers were tested for anti-knock value. Using standardized methods of testing for octane value, it was determined that the polymer products were highly branched in having A. S. T. M. clear octane values of between 85 and 100.

The polymer product or any of its components may be blended with other fuel ingredients in preparing motor fuels, aviation fuels, or aviation safety fuels. The finished fuel compositions may contain various fuel additives, such as antioxidants, gum inhibitors, dyes, color stabilizers, tetraethyl lead, or other anti-knock agents.

It is quite evident that the titanium-gel catalyst promotes polymerization of the olefins at moderately elevated reaction temperatures. The catalyst may also be effective in promoting other reactions which contribute to the formation of the desired products, as, for example, isomerization, alkylation, or condensation reactions.

Although illustrative examples have been given of preferred embodiments of the invention, it is to be understood that the examples are not to be limiting and that modifications come within the spirit and scope of the invention as defined in the appended claims.

I claim:

1. The method of polymerizing a normally gaseous olefin to hydrocarbons boiling in the gasoline boiling range which comprises contacting said gaseous olefin at a temperature between 100° C. and 300° C. with a catalyst consisting of silica gel containing titanium oxide dispersed within its gel structure by hydrolizing titanium sulfate in a potassium acid carbonate solution mixed with silica hydrogel, followed by washing and drying the silica hydrogel thus treated, and calcining the resulting gel containing precipitated titanium oxide at a temperature in the range of 1470° F. to 1670° F.

2. The method as described in claim 1, in which the normally gaseous olefin is propene.

3. The method as described in claim 1, in which the normally gaseous olefin is butene.

4. The method as described in claim 1, in which the normally gaseous olefin is pentene.

5. The process of producing normally liquid hydrocarbons from a normally gaseous olefin at a polymerization temperature in the range of 100° C. to 300° C. with a catalyst composed of an inorganic hydrogel selected from the group consisting of silica, alumina, and magnesia, containing titanium oxide dispersed within its gel structure, by hydrolyzing titanium sulphate in an alkaline metal acid carbonate solution mixed with the said hydrogel, followed by washing and drying the hydrogel thus treated and calcining the resulting gel containing precipitated titanium oxide at a temperature in the range of 1470° F. to 1670° F.

6. The process of producing normally liquid hydrocarbons from a normally gaseous olefin at a polymerization temperature in the range of 100° C. to 300° C. with a catalyst consisting of silica hydrogel containing fine particles of titanium oxide dispersed in its gel structure, said catalyst being formed from an alkaline metal acid carbonate solution of a titanium salt mixed with the silica hydrogel by precipitating the said titanium oxide from the alkaline solution, washing, drying and calcining the thus treated silica gel at a temperature of about 1470° F. to 1670° F.

DAVID W. YOUNG.

REFERENCES CITED

The following references are of record in the file of this patent:

UNITED STATES PATENTS

| Number | Name | Date |
|---|---|---|
| 2,344,911 | Young | Mar. 21, 1944 |
| 2,349,904 | Hachmuth | May 30, 1944 |

FOREIGN PATENTS

| Number | Country | Date |
|---|---|---|
| 392,954 | Great Britain | May 22, 1933 |
| 504,614 | Great Britain | Apr. 24, 1939 |